Jan. 14, 1930.  R. R. COBB  1,743,758
AIR VALVE SAFETY DEVICE
Filed July 25, 1929
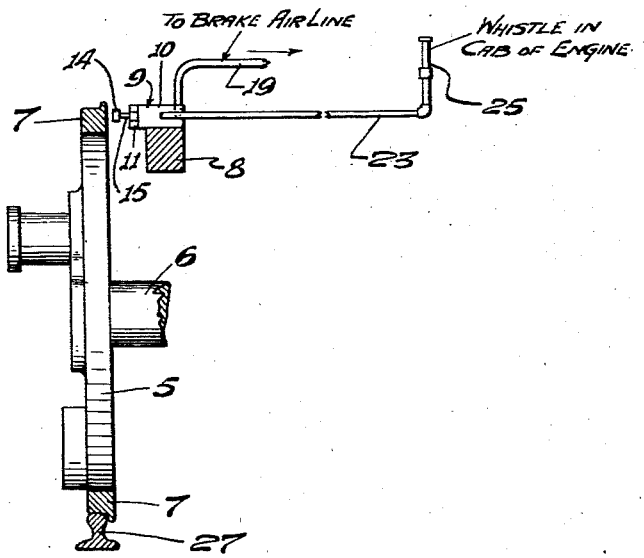
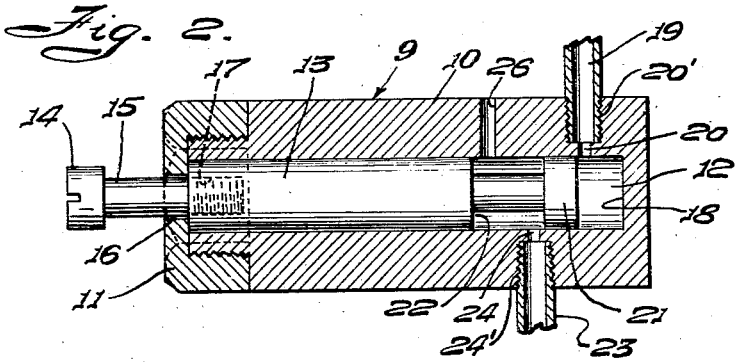
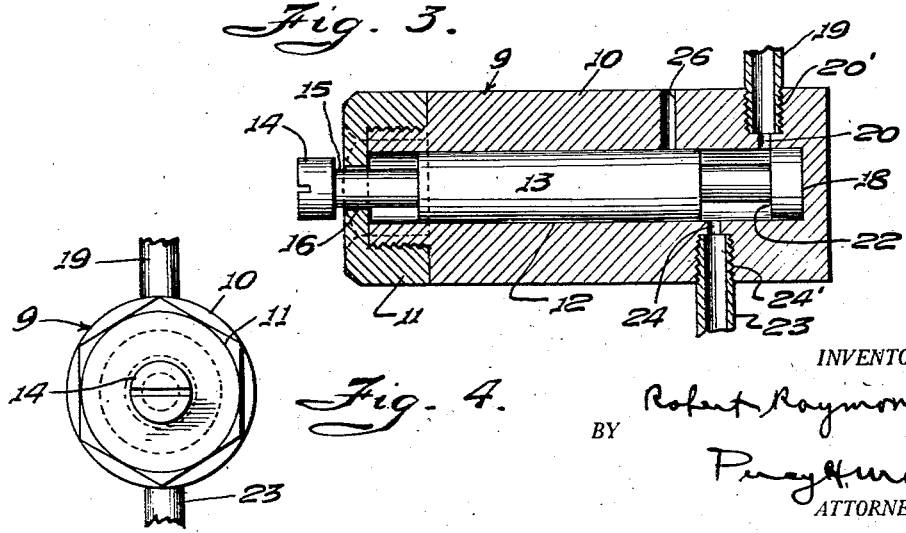
INVENTOR.
Robert Raymond Cobb
BY
Percy H. Moore
ATTORNEY.

Patented Jan. 14, 1930

1,743,758

UNITED STATES PATENT OFFICE

ROBERT RAYMOND COBB, OF HODGES, SOUTH CAROLINA

AIR-VALVE SAFETY DEVICE

Application filed July 25, 1929. Serial No. 380,975.

My invention relates to air valve safety device for use on locomotives.

The principal object of the invention is to apprise the engineer or fireman whenever the tire of a main driving wheel of the locomotive slips.

It frequently happens that the metallic tire of a locomotive wheel will be moved laterally out of alinement with its wheel under the pressure encountered in rounding curves or when striking an uneven section of rail. Unless the engineer learns of this tire trouble quickly a serious accident is likely to occur.

According to my invention any appreciable lateral movement of the tire will open an air valve which in turn actuates a whistle thus notifying the engineer that trouble exists.

With the foregoing and other objects in view, my invention resides in the combination and arrangement of parts hereinafter more particularly pointed out and described in the following specification, and specifically pointed out in the appended claims.

In the accompanying drawings forming part of this specification.

Figure 1 is a fragmentary elevation partly in section showing the device mounted in position to be engaged by the tire of the locomotive wheel;

Figure 2 is a longitudinal section through the valve, showing the trip mechanism in normal extended position;

Figure 3 is a view similar to that seen in Figure 2 with the exception that the air valve trip member is shown in the position assumed when forced inwardly by a slipping tire; and Figure 4 is an end view of air valve.

Referring more particularly to the drawing wherein like reference numerals designate corresponding parts throughout the several views, 5 represents the locomotive driving wheel mounted upon the axle 6. The wheel 5 is provided with the customary metallic tire 7 which engages with and travels over the rail 27. Although only one wheel and rail is shown, it will of course be understood that two of each are employed.

Suitably mounted upon the frame 8 adjacent the side of the locomotive is an air valve member 9, one for each wheel 5, comprising a cylinder 10, the open outer end of which is closed by a threaded apertured cap 11. The cylinder 10 is centrally bored to form the chamber 12 in which a piston or plunger 13 is adapted to be reciprocated, the plunger being of slightly less length and diameter than the chamber 12.

A headed valve trip member 14 is secured to the outer end of the plunger 13 by means of the reduced threaded shank portion 15 thereof, which extends through an aperture 16 in the cap 11 and thence into the threaded recess 17 formed in the outer end of the plunger. When the tire 7 slips on its wheel 5, this movement will be inward toward the trip member 14, thus forcing the latter in a corresponding direction. It will also be understood that the tire slippage or movement is relative only with respect to the wheel and the locomotive frame and body.

The plunger 13 and trip member 14 are normally maintained in outward or figure 2 position by means of air under pressure introduced into the cylinder 10, between the bottom wall 18 of bore 12 and the inner end of the plunger 13, by means of a pipe 19.

This pipe 19 communicates at one end with the usual air line of the locomotive and at its other end screws into the threaded walls 20' of passage 20, in turn leading to the inner end of bore 12. The air pressure exerted against the inner end 21 of plunger 13 forces the outer end thereof against the cap 11 and normally maintains the trip member 14 in extended position. As the cylinder 10 is mounted adjacent the tire 7 and the trip member 14 being in the lateral path of relative movement of the tire it follows that any appreciable relative movement of the tire away from the wheel, and toward the frame 8, will cause the tire and trip member 14 to contact with each other. Continued movement of the tire causes the plunger 13 to move inwardly until the outlet end of pipe 19 is in communication with the annular recess 22 formed in the plunger adjacent the inner end thereof. The air under pressure from pipe 19 will now escape through a pipe 23, screwing into the threaded walls 24' of passage 24 leading to the cylinder bore 12, the inward movement of the plunger 13 having brought the outlet passage 24 into communication with the annular recess 22.

The air outlet pipe 23 leads to the engine cab, not shown, where it exhausts through a whistle or the like 25, thus apprising the engineer that a tire has slipped. An exhaust passage 26, prevents trapping of air when the plunger 13 is moved to outer or normal position.

From the foregoing it will be seen that I have provided a simply constructed and reliable means for automatically apprising the engineer of impending danger due to tire trouble.

Having thus described my invention; what I claim is:

1. In combination with a locomotive a safety air valve member fixed to the locomotive frame adjacent the tire wheel thereof, a whistle in communication with said valve member, a trip member for tripping the valve, means for supplying compressed air under pressure to said valve member for maintaining said trip in the lateral path of relative movement of said wheel tire with respect to the wheel and frame, whereby such movement of the tire will cause the valve to trip and actuate the whistle.

2. In combination with a locomotive, a cylinder and plunger mounted on the locomotive frame adjacent the tire of the wheel thereof, means for supplying air under pressure to said cylinder for normally forcing the plunger outwardly towards said tire, an air outlet normally communicating with the cylinder at one end and provided with a whistle at its other end, said air outlet normally closed by the said plunger, a trip member on said plunger adapted to be engaged by and moved inwardly against the air pressure by the tire, when the tire has relative lateral movement with respect to said frame, thus opening the air outlet and sounding the whistle.

3. In combination with a locomotive, a cylinder and plunger mounted on the locomotive frame adjacent the wheels thereof, means for supplying air under pressure to normally move the plunger in one direction, an air outlet normally closed by the plunger, a whistle in said air outlet, a trip operatively connected to said plunger positioned in the lateral path of movement of the wheel tire with respect to the frame, whereby the slipping of the tire moves the plunger against the air pressure and causes the plunger to open the air outlet and sound the whistle.

In testimony whereof I affix my signature.

ROBERT RAYMOND COBB.